(12) United States Patent
Proctor

(10) Patent No.: US 7,050,442 B1
(45) Date of Patent: May 23, 2006

(54) COMMUNICATIONS SYSTEM, BUS AND METHOD FOR COMMUNICATION OF ATM DATA TRAFFIC

(75) Inventor: Richard J Proctor, Corfe Mullen, Wimborne (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 0 days.

(21) Appl. No.: 09/551,760

(22) Filed: Apr. 18, 2000

(30) Foreign Application Priority Data

Apr. 19, 1999 (GB) .............................. 9908848

(51) Int. Cl.
*H04L 12/56* (2006.01)
*H04L 12/28* (2006.01)

(52) U.S. Cl. ................ 370/395.6; 370/389; 370/395.1; 370/396; 370/392

(58) Field of Classification Search .............. 370/395.1, 370/395.6, 389, 465, 469, 392, 473
See application file for complete search history.

(56) References Cited

U.S. PATENT DOCUMENTS

| 5,418,786 | A | | 5/1995 | Loyer et al. | |
|---|---|---|---|---|---|
| 5,485,456 | A | | 1/1996 | Shtayer et al. | |
| 5,619,499 | A | | 4/1997 | Nakabayashi | |
| 5,946,309 | A | * | 8/1999 | Westberg et al. | ........ 370/395.3 |
| 6,266,343 | B1 | * | 7/2001 | Caves | ........................ 370/466 |
| 6,393,025 | B1 | * | 5/2002 | Merritt | ..................... 370/395.6 |
| 6,483,838 | B1 | * | 11/2002 | Ostman et al. | ........ 370/395.31 |
| 6,574,224 | B1 | * | 6/2003 | Brueckheimer et al. | . 370/395.6 |
| 6,594,267 | B1 | * | 7/2003 | Dempo | .................. 370/395.64 |
| 6,603,767 | B1 | * | 8/2003 | Murakami et al. | ..... 370/395.64 |
| 6,639,916 | B1 | * | 10/2003 | Wakizaka | .................... 370/397 |
| 6,801,542 | B1 | * | 10/2004 | Subbiah | ...................... 370/467 |

FOREIGN PATENT DOCUMENTS

| EP | 0 874 530 A1 | 10/1998 |
|---|---|---|
| WO | WO 98/18286 | 4/1998 |
| WO | WO 98/33355 | 7/1998 |
| WO | WO 98/24263 | 8/1998 |
| WO | WO 98/36541 | 8/1998 |
| WO | WO 98/37728 | 8/1998 |
| WO | WO 99/05881 | 2/1999 |
| WO | WO 99/13879 | 3/1999 |

OTHER PUBLICATIONS

ATM Forum Technical Committee, *Utopia Level 4*, ATM Forum, Online! Mar. 2000, pp. 1–30.

* cited by examiner

*Primary Examiner*—Hassan Kizou
*Assistant Examiner*—Gregory B Sefcheck
(74) *Attorney, Agent, or Firm*—Kirschstein, et al.

(57) ABSTRACT

A communications system comprising device (e.g. an ATM physical layer (PHY)) and higher layer devices (e.g. an ATM layer and an AAL2 layer) are connected via a bus for communication of traffic therebetween, the bus comprising lines for carrying data and control signals. The bus supports data in ATM and AAL2 form and the devices discriminate between the two forms of data traffic. The data in AAL2 form typically comprises AAL2 mini-cells associated with identification of the source of destination of the mini-cells.

35 Claims, 7 Drawing Sheets

|  Bit 15 | Bit 0 |
|---|---|
| Header 1 | Header 2 |
| Header 3 | Header 4 |
| UDF1 | UDF 2 |
| Payload 1 | Payload 2 |
| : | : |
| : | : |
| : | : |
| Payload 47 | Payload 48 |

(16 Bit Mode)

UDF=User Defined

|
time
|
V

FIG. 3     PRIOR ART

COMMUNICATIONS SYSTEM, BUS AND METHOD FOR COMMUNICATION OF ATM DATA TRAFFIC

BACKGROUND OF THE INVENTION

The present invention relates to the field of communications and in particular to a communications system for the transport of ATM and AAL2-type signals.

The Universal Test and Operations PHY Interface for ATM (UTOPIA) bus defines an interface between the physical layer (PHY) and upper layer modules such as the ATM layer and various management entities in an ATM communications system. Two versions of UTOPIA bus have been defined by the ATM forum; UTOPIA level 1 is defined in "UTOPIA, an ATM-PHY Interface" specification level 1, version 2.01, Mar. 21 1994 (af-phy-0017.000) and UTOPIA level 2 is defined in af-phy-0039.000, June 1995. The UTOPIA bus structure supports ATM cells. UTOPIA level 2 also allows for shared interfaces that support many devices. UTOPIA comprises a data bus for carrying ATM cells and sufficient control information to control access to the interfaces. The control information may be carried via the data bus or using external control signals in parallel with the data bus.

The goal of the UTOPIA standard is to define a common, standard interface between ATM and PHY layers of ATM sub-systems. UTOPIA level 1 supports data rates up to 155 Mbit/s via an 8 bit data bus. UTOPIA level 2 supports data rates of up to 622 Mbit/s via an 8 or 16 bit data bus.

The International Telecommunication Union has defined in ITU-TI.363.2 B-ISDN ATM adaptation layer type 2 (AAL2). This specification includes definitions for so-called "AAL2 mini-cells" i.e. the common part sub-layer (CPS) packet. These AAL2 mini-cells are supported by ATM communication networks and currently a significant amount of traffic is carried in this form. The UTOPIA buses, as currently defined, are unable to carry AAL2 mini-cells. The arrangement of the present invention allows mini-cells and ATM cells to be carried via the same bus.

SUMMARY OF THE INVENTION

The present invention provides a communications system comprising a common device and a plurality of higher layer devices connected via a bus for the communication of data traffic between the common device and the higher layer devices in which the bus comprises lines for carrying data and control signals; in which the data traffic comprises data in ATM form and data in AAL2 form; in which the devices comprise discrimination means for discriminating between the two forms of data traffic.

In a preferred embodiment, the invention provides the communications system in which the data in AAL2 form comprises an AAL2 mini-cell associated with a means of identification of the source or destination of the mini-cell.

The invention also provides a method for the communication of data traffic via a bus between a common device and a plurality of higher layer devices; in which the bus comprises lines for carrying data and control signals; in which the data traffic comprises data in ATM form and data in AAL2 form; the method comprising the step of discriminating between the two forms of data traffic.

In a further embodiment, the invention provides a method for the communication of data traffic via a bus between one or more common devices and a plurality of higher layer devices; in which the bus comprises lines for carrying data, control and address signals; in which the address signals are for selecting a device from more than one common device or from the plurality of higher layer devices; in which the data traffic comprises data in ATM form and data in AAL2 form; the method comprising the step of discriminating between the two forms of data traffic.

In a further embodiment, the invention provides a method in which the data in AAL2 form comprises an AAL2 mini-cell associated with a means of identification of the source or destination of the mini-cell.

BRIEF DESCRIPTION OF THE DRAWINGS

The invention will now be described in more detail by way of example and with reference to the accompanying drawings in which:

FIGS. 2 and 3 show UTOPIA cell formats of the prior art;

DETAILED DESCRIPTION OF THE PREFERRED EMBODIMENTS

Figure 1:
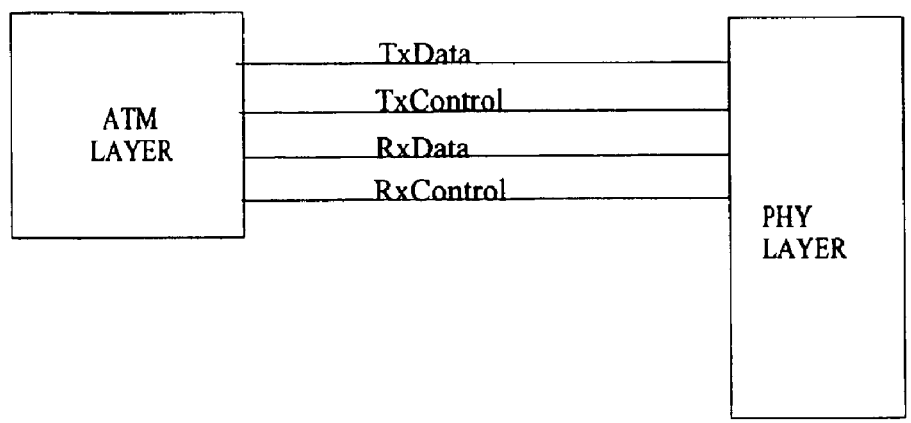
FIG. 1 shows the components of the UTOPIA bus of the prior art.

Referring to FIG. 1, the ATM layer is linked via the UTOPIA bus to the physical (PHY) layer by means of a data bus in each direction and a set of control signals in each direction. By convention information flowing from the ATM layer to the PHY layer is termed 'transmit' and information flowing in the opposite direction is termed 'receive'.

The following control signals are defined as part of the UTOPIA buses (both 8 and 16 bit). In the receive direction the start-of-cell signal (RxSOC) is active for one clock cycle when the receive data contains the first valid octet of a cell. Also defined are the enable signal (RxEnb) and the receive empty/cell available signal (RxEMPTY/RxClav). Synchronization from the ATM layer to the PHY layer is provided by the receive clock (RxClk) for synchronizing receive data.

The following signals are defined as part of the UTOPIA buses in the transmit direction. The transmit start-of-cell signal (TxSOC) is activated for one clock cycle by the ATM layer when the first valid octet of a cell is put on the transmit data bus. Also defined are the transmit enable signal (TxEnb) and the transmit full/cell available signal (TxFull/Clav). The transmit clock (TxClk) is provided by the ATM layer of synchronizing transmit data transfers.

In addition address lines may be present to enable selection by the ATM layer interface of a particular PHY layer interface from a plurality of the same and/or to enable selection by the PHY layer interface of a particular ATM layer interface from a plurality of the same.

Figure 2:
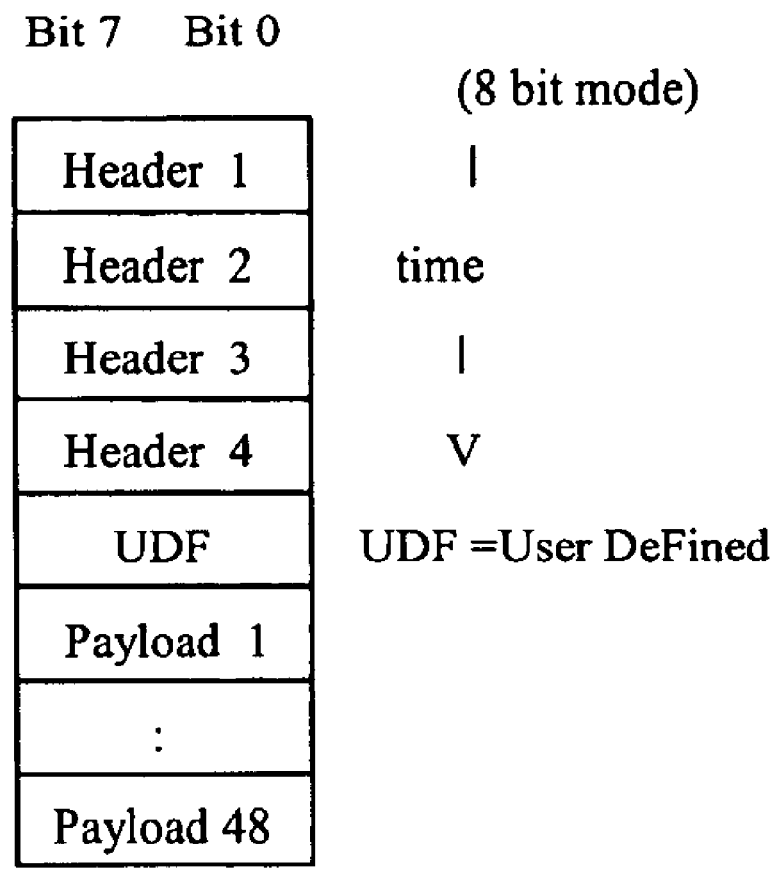

FIG. 2 shows the format of a UTOPIA cell as defined for the 8 bit mode and FIG. 3 shows the cell format for the 16 bit mode. In the 8 bit mode the cell format comprises four octets of header, one user defined octet (UDF) and forty-eight octets of payload. In the 16 bit mode the cell format comprises four octets of header, two user defined octets (UDF 1, UDF2) and again forty-eight octets of payload. The UDF fields received may carry header error correction (HEC) information. However this information is not used and thus the field may be overwritten for the purposes of the present invention.

Figure 4:
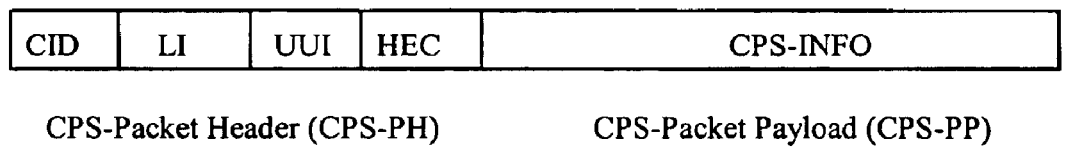
FIG. 4 shows the AAL mini-cell format of the prior art.

FIG. 4 shows the AAL2 mini-cell (CPS packet). The AAL2 mini-cell comprises three octets of header (CPS-PH) and a variable length payload. The header comprises the channel identifier (CID) the length indicator (LI) which defines the length of the mini-cell payload, the user-to-user indication (UUI) and the header error control (HEC).The mini-cell payload and, as a result the mini-cell itself, is variable in length and interfaces processing such mini-cells use the length indication (LI) field to check the length of the mini-cell.

Figure 5:
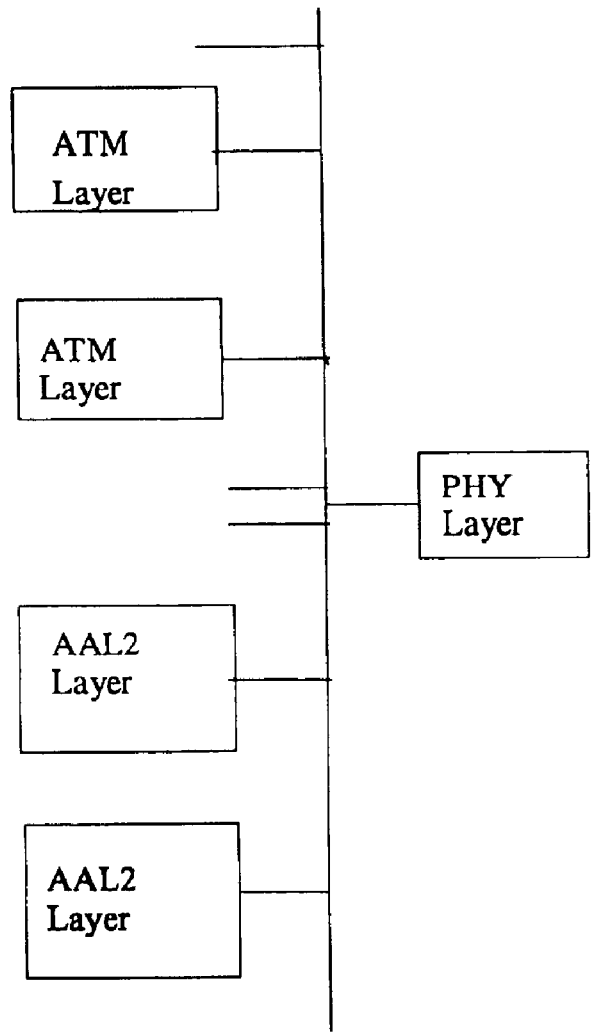
FIG. 5 shows a bus according to an embodiment of the present invention.
Figure 6A:
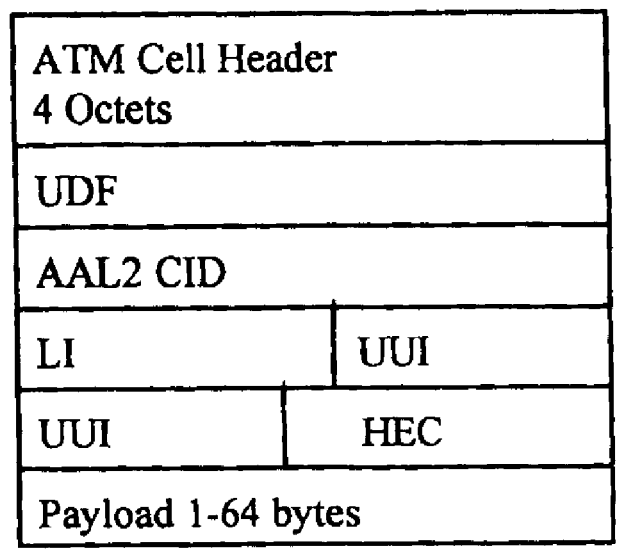
FIGS. 6a and 6b show formats of a mini-cell according to further embodiments of the present invention.

FIG. 5 shows a bus according to the present invention. The bus is shown joining a number of higher layer devices including ATM layer devices and AAL2 layer devices with a single physical layer (PHY) device. The number of higher layer devices is not restricted except that there must be at least one of each type in communication with the bus. In an alternative embodiment (not shown) a plurality of physical layer (PHY) devices may be connected via the bus to a small number of higher layer devices.

Where a mini-cell is to be transferred, it is necessary to identify either the source or the destination of the mini-cell and for this identity to be transported with the mini-cell. This may be achieved according to the present invention by associating with the mini-cell the relevant VCI and VPI values, the PCM number and PCM circuit number or, as the case may be, the SDH virtual container identity depending on the direction of the data transfer. FIG. 6a shows the format of an information structure comprising a mini-cell according to an embodiment of the present invention. The mini-cell comprises four octets of ATM cell header, one octet of UDF, together with a mini-cell. The ATM header comprises the following fields, as defined in the relevant standards, GFC, VPI, VCI, PTI and CLP. The CPS packet comprises the CPS packet header (CPS-PH) as described above with reference to FIG. 4 and the rest of the mini-cell comprises the variable length CPS payload which may be between 1 and 64 bytes long. The functions of the CPS packet header are as described above and will not be described further here. The ATM cell header comprises virtual path identity (VPI) and virtual channel identity (VCI) information to allow identification of the appropriate ATM virtual path and virtual channel for the mini-cell.

Figure 6B:
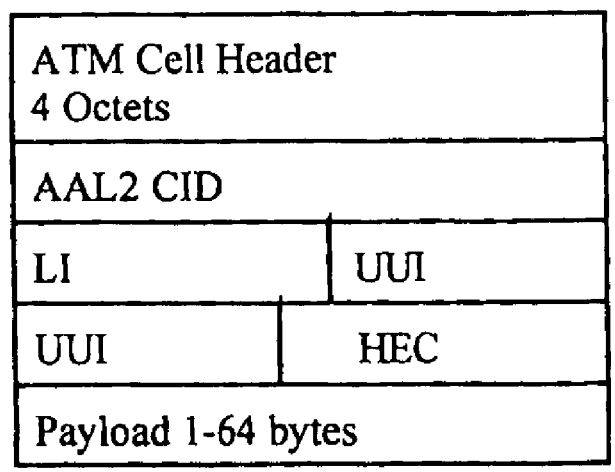

FIG. 6b shows the format of an information structure comprising a mini-cell according to a further embodiment of the present invention. The information structures of FIGS. 6a and 6b are very similar, the difference being that in the information structure of FIG. 6b, the UDF of the ATM header is omitted, thereby saving one octet.

For both formats, the discrimination between ATM and mini-cell data traffic is based on the contents of fifth octet of the information structure. Hence, in the arrangement of FIG. 6a this is the UDF and in the arrangement of FIG. 6b the CID. The contents of this octet would then be interpreted as follows. Where the content of the octet is zero it is interpreted as a valid ATM UDF and a normal ATM cell will be expected to follow. Where the content of the octet is non-zero, an AAL2 CID mini-cell will be expected to follow. Two alternatives now exist. In the arrangement of FIG. 6a, the next octet (i.e. the sixth) will contain the CID and will be read to identify the channel. In the arrangement of FIG. 6b, the non-zero value of the fifth octet is the CID octet and will be read to identify the channel. The above arrangement is compatible with the ITU-T definition of mini-cells where a zero value of CID is not used for channel identification.

Figure 7:
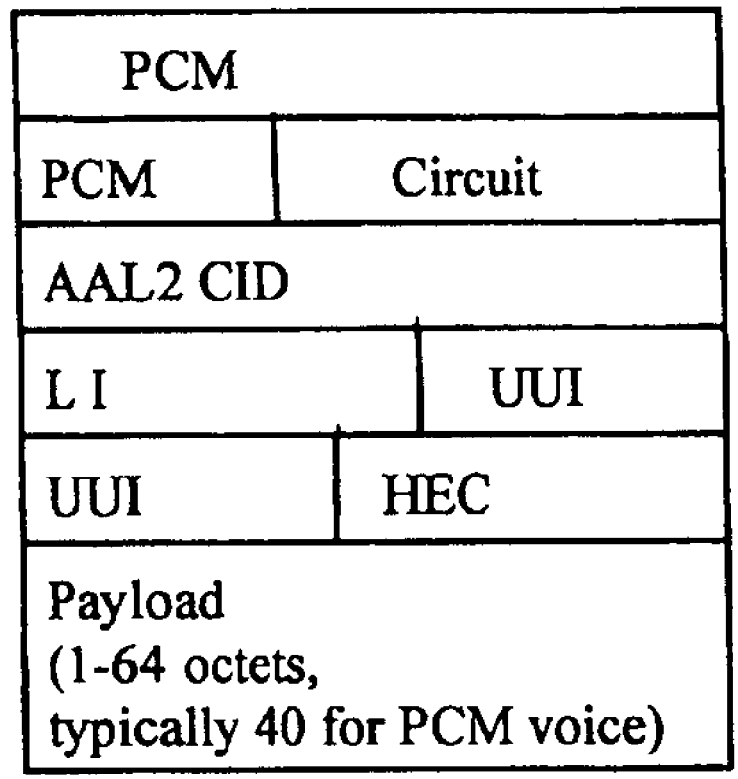
FIG. 7 shows a format of a mini-cell according to a further embodiment of the present invention.

FIG. 7 shows the format of an information structure in the form of a mini-cell according to a second embodiment of the present invention. The lower part of the information structure of FIG. 7 comprises the CPS packet similar to that described above in relation to the embodiment of FIG. 6, however instead of the ATM header octets, the upper part of the information structure now comprises a PCM number for identifying a pulse code modulation (PCM) and a PCM circuit number for identifying a PCM circuit over which the mini-cell is to be routed. As a further alternative (not shown) the PCM information could be replaced with the identity of a synchronous digital hierarchy (SDH) virtual container.

The operation of the communications system of the present invention will now be described. Discrimination between forms of data traffic, i.e. ATM and AAL2, may be achieved, according to the present invention, as follows. Each interface to the bus may be arranged to use a control signal from the bus for discriminating between the two forms of data traffic. Advantageously, the control signal is the start of cell (SOC) signal. The signal is defined in the UTOPIA recommendations as going active for a single cycle of the relevant synchronizing clock signal (i.e. either RxClk or TxClk) to indicate the start of an ATM cell. According to the present invention, the SOC signal is defined as going active for two successive cycles of the relevant synchronizing clock signal to indicate transmission of a mini-cell. Alternatively, an additional signal may be provided on the bus, i.e. in addition to those defined in UTOPIA recommendations for this purpose.

According to a further, preferred embodiment, the discrimination means comprises means to use a field of the data traffic for discriminating between the two forms of data traffic. Advantageously, the field used is the user defined field (UDF) in the ATM data or the CID field in the AAL2 data. The AAL2 CID field has no defined meaning for a zero value (other than as null filler) which should never be seen in a valid mini-cell, whereas the content of the ATM UDF field is arbitrary and could, according to a further embodiment, be used to discriminate between more than two forms of data.

The interfaces are advantageously adapted, according to this invention, to identify the position in the data stream of UDF and CD octets and to interpret the associated data according the value found in those octets. Alternatively, the second octet of a 16 bit UDF field could be used for this purpose.

In further preferred embodiment, the contents of the VPI field or the VPI and VCI fields taken in combination is used to discriminate between the two forms of data traffic. According to this embodiment, VPs or VP/VC combinations are allocated according to the type of data traffic to be carried. Advantageously, only the top bit of the VPI field would be used in this way, e.g. with a value of zero indicating an ATM cell and a value of one indicating a mini-cell.

In a preferred embodiment, each mini-cell forms part of an ATM virtual path (VP) and/or virtual channel (VC) and the identity of the relevant VP or VC must be transferred across the bus in association with each mini-cell. A VP indication (VPI) field and a VC indication (VCI) field are defined in ATM standards for the purpose of identifying VPs and VCs respectively. Hence, each mini-cell transported via the bus is associated with an ATM header comprising a virtual path indication (VPI) field and a virtual channel indication (VCI) field for use for determining the relevant VP and VC.

In a further, preferred embodiment of the present invention, the form of data traffic is discriminated by a combination of two or more of the above means. The present invention is also applicable to other type of bus, such as UTOPIA levels 3 and 4.

I claim:

1. A communications system, comprising:
   a common device;
   a plurality of higher layer devices;
   a bus for communicating data traffic comprising data in asynchronous transfer mode (ATM) form and data in adaptation layer type 2 (AAL2) form between the common device and the higher layer devices, the bus including lines for carrying data and control signals, the data in AAL2 form including an AAL2 mini-cell associated with a means of identification of at least one of a source and a destination of the mini-cell; and
   the devices including discrimination means for discriminating between the two forms of the data traffic.

2. The communications system of claim 1, in which the means of identification includes an ATM header.

3. The communications system of claim 2, in which the data in AAL2 form is associated with an ATM virtual path (VP) and an ATM virtual channel (VC), in which the ATM header comprises a virtual path identifier (VPI) field and a virtual channel identifier (VCI) field; and the VPI and VCI fields being used for determining the associated VP and VC, respectively.

4. The communications system of claim 1, in which the means of identification includes a pulse code modulation (PCM) circuit identifier.

5. The communications system of claim 1, in which the means of identification includes an identity of a synchronous digital hierarchy (SDH) virtual container.

6. The communications system of claim 1, in which the common device includes an ATM physical layer (PHY), and in which the plurality of higher layer devices includes an ATM layer and an AAL2 layer.

7. The communications system of claim 1, in which the discrimination means includes means for using a control signal from the bus for discriminating between the two forms of the data traffic.

8. The communications system of claim 7, in which the control signal is a start of cell (SOC) signal.

9. The communications system of claim 8, in which the discrimination means includes means to discriminate between the two forms of the data traffic depending on a number of clock cycles that the SOC signal is active.

10. The communications system of claim 7, in which the control signal is an additional signal.

11. A communications system, comprising:
    a common device;
    a plurality of higher layer devices;
    a bus for communicating data traffic comprising data in asynchronous transfer mode (ATM) form and data in adaptation layer type 2 (AAL2) form between the common device and the higher layer devices, the bus including lines for carrying data and control signals; and
    the devices including discrimination means for discriminating between the two forms of the data traffic, the discrimination means including means for using a field of the data traffic for discriminating between the two forms of the data traffic.

12. The communications system of claim 11, in which the data traffic includes a user defined field (UDF) in which the field used for discriminating is the UDF.

13. The communications system of claim 11, in which the data in AAL2 form includes an AAL2 mini-cell, in which the data in ATM form includes an ATM cell, and in which the field used for discriminating includes a fifth octet of the cells.

14. The communications system of claim 13, in which the fifth octet of the AAL2 mini-cell includes a channel identification (CID) field.

15. The communications system of claim 11, in which the bus includes lines for carrying address signals for selecting a device from the plurality of the higher layer devices.

16. The communications system of claim 11, and further comprising additional common devices, and in which the bus includes lines for carrying address signals for selecting a device from the common devices.

17. A method of communicating data traffic comprising data in asynchronous transfer mode (ATM) form and data in adaptation layer type 2 (AAL2) form via a bus between a common device and a plurality of higher layer devices, the bus including lines for carrying data and control signals, the method comprising the steps of: discriminating between the two forms of the data traffic; and the data in AAL2 form including an AAL2 mini-cell associated with a step of identification of at least one of a source and a destination of the mini-cell.

18. The method of claim 17, in which the step of identification includes an ATM header.

19. The method of claim 18, in which the data in AAL2 form is associated with an ATM virtual path (VP) and an ATM virtual channel (VC), in which the ATM header comprises a virtual path identifier (VPI) field and a virtual channel identifier (VCI) field; and the VPI and VCI fields being used for determining the associated VP and VC, respectively.

20. The method of claim 17, in which the step of identification includes a pulse code modulation (PCM) circuit identifier.

21. The method of claim 17, in which the step of identification includes an identity of a synchronous digital hierarchy (SDH) virtual container.

22. The method of claim 17, in which the common device includes an ATM physical layer (PHY), and in which the plurality of higher layer devices includes an ATM layer and an AAL2 layer.

23. The method of claim 17, in which the discrimination step includes the step of using a control signal from the bus for discriminating between the two forms of the data traffic.

24. The method of claim 23, in which the control signal is a start of cell (SOC) signal.

25. The method of claim 24, and further comprising the step of monitoring the SOC signal, and in which the discrimination step is performed by discriminating between the two forms of the data traffic depending on a number of clock cycles that the SOC signal is active.

26. The method of claim 23, in which the control signal is an additional signal.

27. A method of communicating data traffic comprising data in asynchronous transfer mode (ATM) form and data in adaptation layer type 2 (AAL2) form via a bus between a common device and a plurality of higher layer devices, the bus including lines for carrying data and control signals, the method comprising the step of: discriminating between the two forms of the data traffic by using a field of the data traffic for discriminating between the two forms of the data traffic.

28. The method of claim 27, in which the data traffic includes a user defined field (UDF) in which the field used for discriminating is the UDF.

29. The method of claim 27, in which the data in AAL2 form includes an AAL2 mini-cell, in which the data in ATM form includes an ATM cell, and in which the field used for discriminating includes a fifth octet of the cells.

30. The method of claim 29, in which the fifth octet of the AAL2 mini-cell includes a channel identification (CID) field.

31. The method of claim 27, n which the bus includes lines for carrying address signals for selecting a device from the plurality of the higher layer devices.

32. The method of claim 27, and further comprising additional common devices, and in which the bus includes lines for carrying address signals for selecting a device from the common devices.

33. The method of claim 27, in which the field used for discriminating is one of a virtual channel identifier (VCI) field and a virtual path identifier (VPI) field.

34. The method of claim 27, in which the data traffic includes a pulse code modulation (PCM) field, and in which the field used for discriminating is the PCM field.

35. A method of communicating data traffic comprising data in asynchronous transfer mode (ATM) form and data in adaptation layer type 2 (AAL2) form via a bus between a plurality of common devices and a plurality of higher layer devices, the bus including lines for carrying data, control and address signals, the address signals being used for selecting one of the devices, the method comprising the step of: discriminating between the two forms of the data traffic.

* * * * *

UNITED STATES PATENT AND TRADEMARK OFFICE
CERTIFICATE OF CORRECTION

PATENT NO. : 7,050,442 B1  Page 1 of 1
APPLICATION NO. : 09/551760
DATED : May 23, 2006
INVENTOR(S) : Proctor It is certified that error appears in the above-identified patent and that said Letters Patent is hereby corrected as shown below:

On the Title Page, in Field (56), under "FOREIGN PATENT DOCUMENTS", in Column 2, Line 4, delete "8/1998" and insert -- 6/1998 --, therefor.

On the Title Page, in Field (56), under "FOREIGN PATENT DOCUMENTS", in Column 2, Line 8, delete "WO 99/13879" and insert -- WO 99/13679 --, therefor.

On the Title Page, in Field (57), under "ABSTRACT", in Column 2, Line 1, after "comprising" insert -- a common --.

On the Title Page, in Field (57), under "ABSTRACT", in Column 2, Line 6, after "ATM" insert -- form --.

On the Title Page, in Field (57), under "ABSTRACT", in Column 2, Line 9, delete "source of" and insert -- source or --, therefor.

In Column 2, Line 53, delete "of" and insert -- for --, therefor.

In Column 4, Line 44, delete "CD" and insert -- CID --, therefor.

In Column 5, Line 4, delete "type" and insert -- types --, therefor.

In Column 7, Line 8, in Claim 31, delete "n" and insert -- in --, therefor.

Signed and Sealed this

Seventeenth Day of February, 2009

JOHN DOLL
*Acting Director of the United States Patent and Trademark Office*